US012801985B2

(12) United States Patent
Wang et al.

(10) Patent No.: US 12,801,985 B2
(45) Date of Patent: Nov. 17, 2026

(54) METHOD, DEVICE, AND COMPUTER PROGRAM PRODUCT FOR ITERATIVE MACHINE LEARNING BASED PROCESSING OF SAMPLES TO GENERATE TRAINING DATA FOR CHATBOT MODEL

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 874 days.

(21) Appl. No.: 18/130,744

(22) Filed: Apr. 4, 2023

(65) Prior Publication Data

US 2024/0303534 A1 Sep. 12, 2024

(30) Foreign Application Priority Data

Mar. 10, 2023 (CN) ........................ 202310239990.3

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

PUBLICATIONS

Henry, Jazmia. "MLOps: A Primer for Policymakers on a New Frontier in Machine Learning." arXiv preprint arXiv:2301.05775 (2023). (Year: 2023).*

Lu, Jie, et al. "Learning under concept drift: A review." IEEE transactions on knowledge and data engineering 31.12 (2018): 2346-2363. (Year: 2018).*

Baier, Lucas. Concept drift handling in information systems: Preserving the validity of deployed machine learning models. Diss. Dissertation, Karlsruhe, Karlsruher Institut für Technologie (KIT), 2021, 2021. (Year: 2021).*

A. Xu et al., "A New Chatbot for Customer Service on Social Media," Proceedings of the 2017 CHI Conference on Human Factors in Computing Systems, May 2017, pp. 3506-3510.

(Continued)

*Primary Examiner* — Vincent Gonzales
(74) *Attorney, Agent, or Firm* — Ryan, Mason & Lewis, LLP

(57) ABSTRACT

A method includes: determining a first sample subset in an initial sample set by an initial model based on the initial sample set, wherein the initial sample set comprises a plurality of question-answer pairs, each of the plurality of question-answer pairs comprising a question and an answer; generating a first model by training the initial model with the first sample subset; determining a second sample subset in the first sample subset by the first model based on the first sample subset; generating a second model by training the first model with the second sample subset; determining, in response to at least one of the second sample subset and the second model satisfying a corresponding predetermined condition, a third sample subset of the initial sample set by the second model based on the initial sample set; and generating a third model by training the second model with the third sample subset.

20 Claims, 6 Drawing Sheets

(56) References Cited

PUBLICATIONS

I. Sutskever et al., “Sequence to Sequence Learning with Neural Networks,” Proceedings of the 27th International Conference on Neural Information Processing Systems, vol. 2, Dec. 2014, pp. 3104-3112.

P. Malhotra et al., “Long Short Term Memory Networks for Anomaly Detection in Time Series,” European Symposium on Artificial Neural Networks, Computational Intelligence and Machine Learning, Apr. 2015, 6 pages.

* cited by examiner

METHOD, DEVICE, AND COMPUTER PROGRAM PRODUCT FOR ITERATIVE MACHINE LEARNING BASED PROCESSING OF SAMPLES TO GENERATE TRAINING DATA FOR CHATBOT MODEL

RELATED APPLICATION

The present application claims priority to Chinese Patent Application No. 202310239990.3, filed Mar. 10, 2023, and entitled "Method, Device, and Computer Program Product for Processing Data," which is incorporated by reference herein in its entirety.

FIELD

Embodiments of the present disclosure relate generally to the field of computers, and more specifically to a method, a device, and a computer program product for processing data.

BACKGROUND

Chatbot is a type of computer software that can conduct conversations verbally or via text. Chatbots are built in a manner that allows them to be integrated with messengers and to utilize artificial intelligence (AI) technologies.

Chatbots provide enterprises with new prospects for communication. Providing chatbot-based services to customers enables, for example, responding to inquiries and fulfilling orders without time constraints, which will save costs for enterprises.

SUMMARY

Embodiments of the present disclosure provide a solution for processing data.

In a first aspect of the present disclosure, a method for processing data is provided, the method including: determining a first sample subset in an initial sample set by an initial model based on the initial sample set, wherein the initial sample set comprises a plurality of question-answer pairs, each of the plurality of question-answer pairs comprising a question and an answer; generating a first model by training the initial model with the first sample subset; determining a second sample subset in the first sample subset by the first model based on the first sample subset; generating a second model by training the first model with the second sample subset; determining, in response to at least one of the second sample subset and the second model satisfying a corresponding predetermined condition, a third sample subset of the initial sample set by the second model based on the initial sample set; and generating a third model by training the second model with the third sample subset.

In another aspect of the present disclosure, an electronic device for processing data is provided. The electronic device includes a processor and a memory coupled to the processor and having instructions stored thereon, wherein these instructions, when executed by the processor, cause the electronic device to perform the following actions: determining a first sample subset in an initial sample set by an initial model based on the initial sample set, wherein the initial sample set comprises a plurality of question-answer pairs, each of the plurality of question-answer pairs comprising a question and an answer; generating a first model by training the initial model with the first sample subset; determining a second sample subset in the first sample subset by the first model based on the first sample subset;

generating a second model by training the first model with the second sample subset; determining, in response to at least one of the second sample subset and the second model satisfying a corresponding predetermined condition, a third sample subset of the initial sample set by the second model based on the initial sample set; and generating a third model by training the second model with the third sample subset.

In a further aspect of the present disclosure, a computer program product is provided. The computer program product is tangibly stored on a non-transitory computer-readable storage medium and includes machine-executable instructions, wherein the machine-executable instructions, when executed by a machine, cause the machine to perform a method or process according to embodiments of the present disclosure.

It should be noted that this Summary is provided to introduce in a simplified form a set of concepts that will be further described below in specific embodiments. The Summary is neither intended to identify key features or major features of content of the present disclosure, nor intended to limit the scope of the content of the present disclosure.

BRIEF DESCRIPTION OF THE DRAWINGS

The foregoing and other objectives, features, and advantages of the present disclosure will become more clearly understood by reference to the following Detailed Description of embodiments of the present disclosure, to be viewed in conjunction with the accompanying drawings, in which.

Throughout all the drawings, the same or similar reference numerals generally represent the same or similar elements.

DETAILED DESCRIPTION

Figure 1:
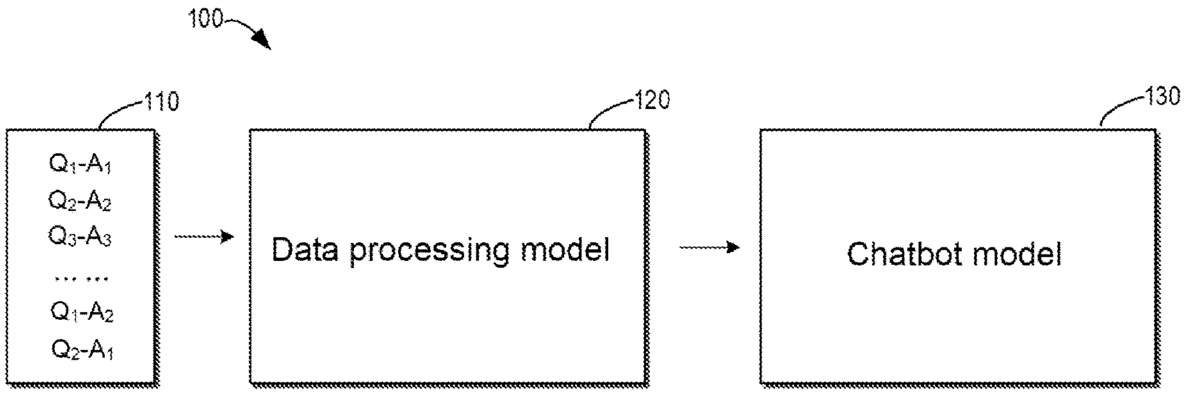
FIG. 1 illustrates a schematic diagram of an example environment in which a method and/or a process according to embodiments of the present disclosure can be implemented.

Illustrative embodiments of the present disclosure will be described in more detail below with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "including" and its variations should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects, unless otherwise specifically indicated.

As described above, chatbot is a type of computer software that conducts conversations verbally or via text using artificial intelligence (AI) technologies. By using chatbots, support personnel can be freed from questions such as "How do I buy this product?" Support personnel can also answer the phone promptly if a question is too complex for a chatbot.

However, there is not yet a chatbot that can conduct conversations perfectly. In practical applications, there is often a mismatch between users' questions and chatbots' answers, resulting in a decline in public expectations of chatbots. One of the reasons for the degradation of chatbots is that the conversation data used to train chatbot models is always "dirty," and uncleaned conversation data degrades the training of chatbot models, making them less accurate.

Some conventional conversation data cleaning methods are specific to particular domains or tasks and cannot be generalized. Some other conventional conversation data cleaning methods rely heavily on manual work and cannot be automated, resulting in increased labor costs and poor accuracy.

To address at least some of the above and other potential problems, embodiments of the present disclosure provide a solution for processing data. The solution includes: determining a first sample subset in an initial sample set by an initial model based on the initial sample set, wherein the initial sample set comprises a plurality of question-answer pairs, each of the plurality of question-answer pairs comprising a question and an answer; generating a first model by training the initial model with the first sample subset; determining a second sample subset in the first sample subset by the first model based on the first sample subset; generating a second model by training the first model with the second sample subset; determining, in response to at least one of the second sample subset and the second model satisfying a corresponding predetermined condition, a third sample subset of the initial sample set by the second model based on the initial sample set; and generating a third model by training the second model with the third sample subset. In this way, an automatic conversation data cleaning approach is provided, which is applicable to various different types of conversation data. In this manner, the sample quality can be improved, thereby improving the performance of a chatbot model.

Basic principles and some example implementations of the present disclosure are illustrated below with reference to FIG. 1 to FIG. 6. It should be understood that these example embodiments are given only to enable those skilled in the art to better understand and thus implement embodiments of the present disclosure, and are not intended to limit the scope of the present disclosure in any way.

FIG. 1 illustrates a schematic diagram of an example environment 100 in which a method and/or a process according to embodiments of the present disclosure can be implemented. In this example environment 100, an initial sample set can be input as input 110 into a data processing model 120 according to an embodiment of the present disclosure at a computing device. Conversation data cleaning according to embodiments of the present disclosure is achieved by performing corresponding calculations (e.g., the data processing process described below) at the computing device by the data processing model 120. The cleaned conversation data is input into a chatbot model 130 for training the model.

For the input 110, the initial sample set includes a plurality of question-answer pairs as samples, each of the plurality of question-answer pairs including a question (which may be abbreviated as Q below) and an answer (which may be abbreviated as A below). According to embodiments of the present disclosure, the initial sample set may also include a predetermined number of negative samples randomly generated. The samples included in the initial sample set may be pre-processed, and the pre-processing process will be described in detail below. It should be understood that the questions in these question-answer pairs may each correspond to a plurality of answers (for example, $Q_1$-$A_1$ and $Q_1$-$A_2$), and the answers in these questions may each correspond to a plurality of questions (for example, $Q_1$-$A_1$ and $Q_2$-$A_1$), as illustrated in FIG. 1. Here, conversation data (e.g., a plurality of question-answer pairs) is used as an example to describe the data cleaning process according to embodiments of the present disclosure. It should be understood, however, that the present disclosure is not limited to conversation data, and that the method for processing data according to embodiments of the present disclosure is also capable of achieving cleaning of other different types of data.

At the computing device, the data processing model 120 according to embodiments of the present disclosure receives the input 110 and performs the method for processing data according to embodiments of the present disclosure to clean the input 110. According to embodiments of the present disclosure, the data processing model 120 according to embodiments of the present disclosure may include a model based on bidirectional encoder representations from transformers (BERT). It should be understood that the present disclosure is not limited to BERT-based models and may also include other different models. The computing device may be any device with computing power. Examples of the computing device may include a smart phone, a tablet computer, a personal computer, a laptop computer, a server computer, a multiprocessor system, a wearable electronic device, a multimedia player, a personal digital assistant (PDA), a smart home device, a consumer electronic product, and the like. Examples of the computing device may also include a distributed computing environment that includes any of the above systems or devices, and the like.

Conversation data cleaned by the data processing model 120 according to embodiments of the present disclosure is input to the chatbot model 130 for use in training this model. According to embodiments of the present disclosure, the chatbot model 130 may include a long short-term memory (LSTM) based model. It should be understood that the present disclosure is not limited to LSTM-based models and may also include other different models. It should also be understood that the chatbot model 130 as well as the data processing model 120 according to embodiments of the present disclosure may be deployed at the same computing device or may also be deployed at different computing devices in a distributed manner.

The schematic diagram of the example environment 100 in which the method and/or process according to embodiments of the present disclosure can be implemented is described above in conjunction with FIG. 1. A flow chart of a method 200 for processing data according to embodiments of the present disclosure will be described below with reference to FIG. 2. As described above for the computing device, the method 200 for processing data according to embodiments of the present disclosure may be executed at an edge device with computing power or at a cloud server, and the present disclosure is not limited in this regard.

Figure 2:
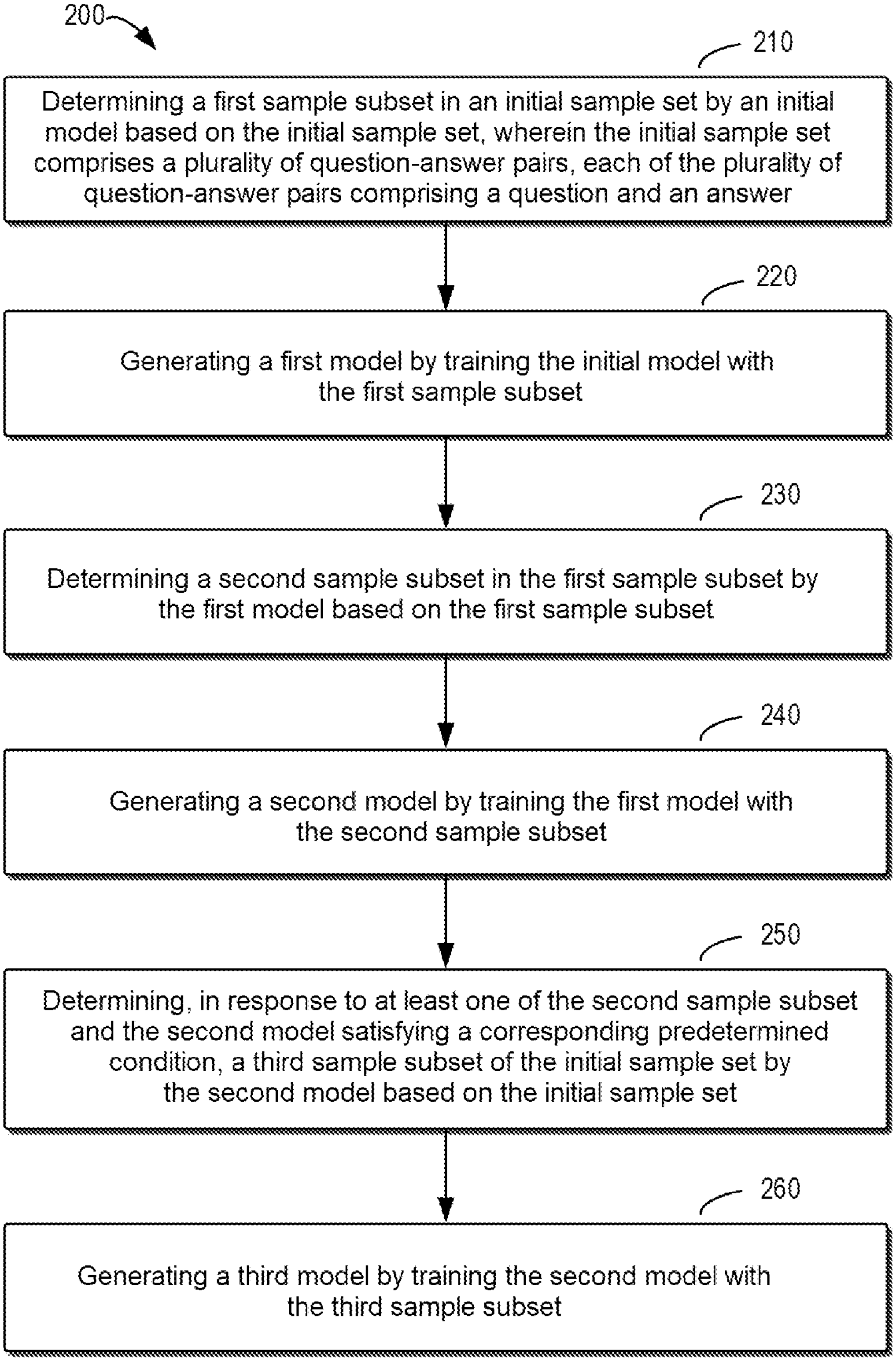
FIG. 2 illustrates a flow chart of a method for processing data according to embodiments of the present disclosure.

FIG. 2 illustrates a flow chart of the method 200 for processing data according to embodiments of the present disclosure. The application of chatbots provides convenience for, for example, both enterprises and customers. For enterprises, chatbots can free employees from heavy customer inquiries, and enterprises can focus more on design and manufacturing of products. For customers, they can, for example, make inquiries or place orders through chatbots whenever they want to.

To ensure the accuracy of a chatbot model, samples used to train the chatbot model are cleaned. To this end, the method 200 for processing data according to embodiments of the present disclosure is provided.

At 210, a first sample subset in an initial sample set is determined by an initial model based on the initial sample set, wherein the initial sample set comprises a plurality of question-answer pairs, each of the plurality of question-answer pairs comprising a question and an answer. According to embodiments of the present disclosure, the remaining samples in the initial sample set can be obtained as the first sample subset by removing samples having a match probability lower than a first match probability threshold in the initial sample set. The first sample subset has a higher reliability than the original sample set.

Optionally, according to embodiments of the present disclosure, the first sample subset can be obtained by removing samples having a match probability lower than the first match probability threshold and higher than a first lower-limit match probability threshold in the initial sample set, the first lower-limit match probability threshold being less than the first match probability threshold. In this way, it is possible to prevent too many samples from being removed in one cleaning process.

At 220, a first model is generated by training the initial model with the first sample subset. After obtaining the first sample subset in the initial sample set determined at 210, according to embodiments of the present disclosure, the first model can be generated by training the initial model with the determined first sample subset. A predetermined number of negative samples randomly generated may also be utilized in the process of generating the first model. In other words, after the initial model is trained using the first sample subset, its parameter set may be adjusted to generate an updated first model. In this way, the accuracy of the generated first model is better than the accuracy of the initial model.

At 230, a second sample subset in the first sample subset is determined by the first model based on the first sample subset. According to embodiments of the present disclosure, a second sample subset in the first sample subset may be determined by the first model generated at 220 based on the first sample subset determined at 210, wherein the process of determining the second sample subset may be similar to the process of determining the first sample subset described above, i.e., by removing samples having a match probability lower than a second match probability threshold in the first sample subset and obtaining the remaining samples in the first sample subset as the second sample subset. However, it should be noted that the second match probability threshold is greater than the first match probability threshold. In other words, the condition for determining the second sample subset is more stringent than the condition for determining the first sample subset. Similarly, the second sample subset has a higher reliability than the first sample subset.

At 240, a second model is generated by training the first model with the second sample subset. After obtaining the second sample subset in the first sample subset determined at 230, according to embodiments of the present disclosure, the second model can be generated by training the first model generated at 220 with the determined second sample subset. A predetermined number of negative samples randomly generated may also be utilized in the process of generating the second model. In other words, after the first model is trained using the second sample subset, its parameter set may be adjusted to generate an updated second model. Similarly, the accuracy of the generated second model is better than the accuracy of the first model.

At 250, in response to at least one of the second sample subset and the second model satisfying a corresponding predetermined condition, a third sample subset of the initial sample set is determined by the second model based on the initial sample set. According to embodiments of the present disclosure, when the second sample subset determined at 230 satisfies its predetermined condition, or the second model generated at 240 satisfies its predetermined condition, or both the second sample subset and the second model satisfy the corresponding predetermined conditions, a third sample subset of the initial sample set is determined by the second model based on the initial sample set, wherein the process of determining the third sample subset may be similar to the process of determining the first sample subset described above, but the third match probability threshold is greater than the second match probability threshold.

According to embodiments of the present disclosure, at least one of the second sample subset and the second model satisfying a corresponding predetermined condition may include: the number of samples removed to obtain the second sample subset being less than a second number threshold, and the accuracy of the second model reaching a second accuracy threshold.

At 260, a third model is generated by training the second model with the third sample subset. After obtaining the third sample subset of the initial sample set determined at 250, according to embodiments of the present disclosure, the third model can be generated by training the second model generated at 240 using the determined third sample subset. A predetermined number of negative samples randomly generated may also be utilized in the process of generating the third model. In other words, after the second model is trained using the third sample subset, its parameter set may be adjusted to generate an updated third model. Similarly, the accuracy of the generated third model is better than the accuracy of the second model. By performing data cleaning by the method 200 for processing data according to embodiments of the present disclosure, unreliable samples can be iteratively removed, thereby improving the quality of the sample set.

Figure 3:
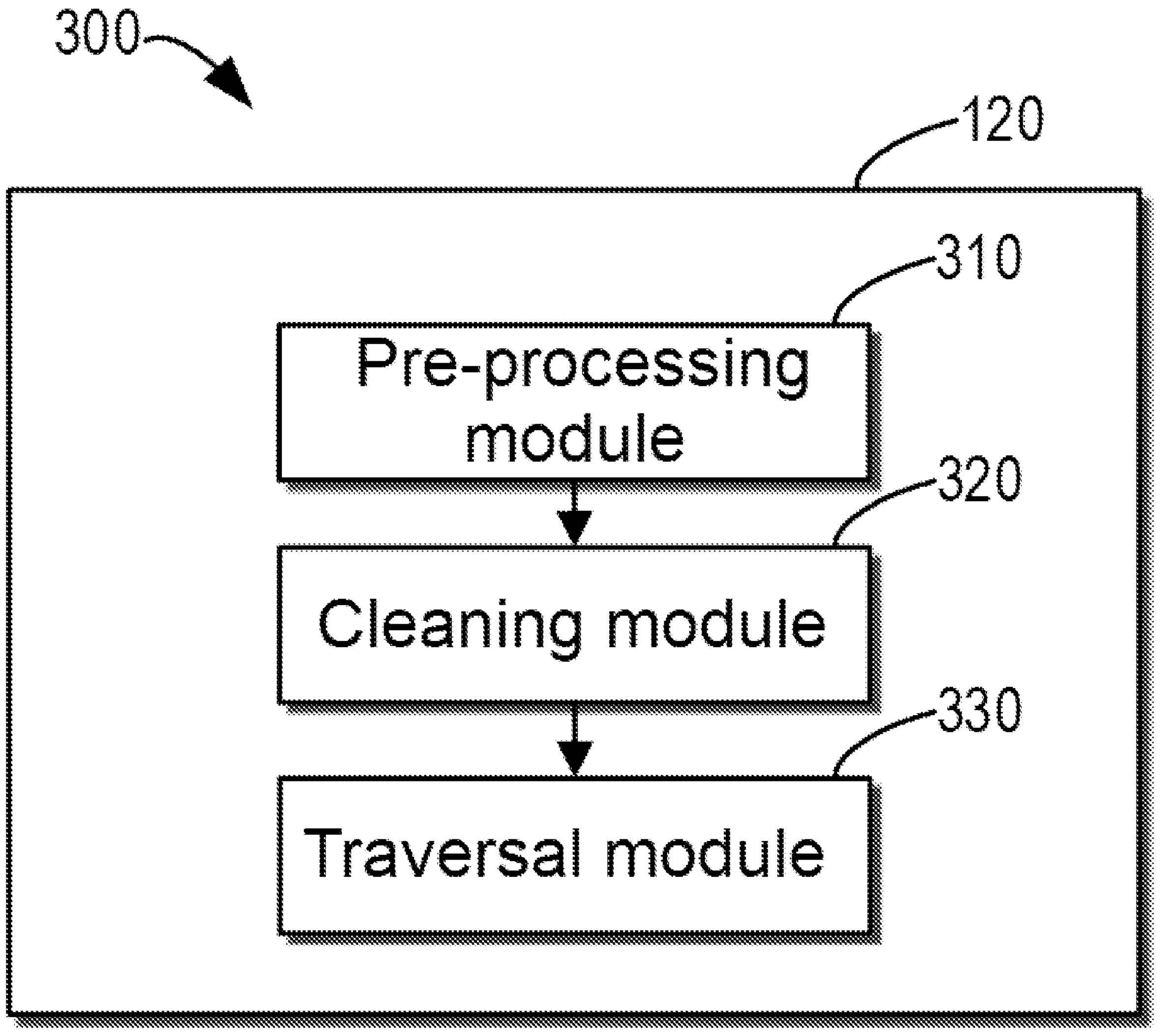
FIG. 3 is a schematic diagram illustrating a framework of a data processing model according to embodiments of the present disclosure.

FIG. 3 is a schematic diagram illustrating a framework 300 of a data processing model 120 according to embodiments of the present disclosure. As illustrated in FIG. 3, the data processing model 120 according to embodiments of the present disclosure may include a pre-processing module 310, a cleaning module 320, and a traversal module 330.

According to embodiments of the present disclosure, the samples included in the initial sample set may be pre-processed. The pre-processing performed by the pre-processing module 310 may include: obtaining tokens for original data (e.g., the collected conversation data) by tokenizing the original data. Taking conversation data as an example, the tokens may be words, sentences, or paragraphs.

The pre-processing performed by the pre-processing module 310 also includes: standardizing the obtained tokens to obtain the standardized tokens. In some example embodiments, standardization may include normalizing the case (for languages such as English) and removing punctuation so that the machine identifies identical words. In some example embodiments, standardization may include stem extraction, that is, determining the basic form of a word for its different forms (such as, in the case of a language such as English, singular-plural, different forms of verbs, etc.). In some example embodiments, standardization may include converting non-literal tokens, such as converting "6" to "six." In some example embodiments, standardization may also include filtering stop words such as articles, prepositions, adverbs, or conjunctions.

The pre-processing performed by the pre-processing module 310 also includes: obtaining the initial sample set by adjusting the standardized tokens. In response to finding an error (e.g., wrongly written or mispronounced character/word or abbreviation, etc.) in the standardized tokens, the pre-processing module 310 may make adjustments to these standardized tokens, such as removing the errors found.

As described above, training a model using unreliable data will result in model degradation, such as causing a chatbot to fail to give accurate answers to users' questions. To this end, data cleaning according to embodiments of the present disclosure is provided, where the least reliable data is removed with the trained model, then a new model is trained with the remaining data, then the least reliable data is removed from the remaining data with the new model, and so on until the model achieves high accuracy on the training set. However, there may be a small amount of data left after screening. To recall some data that was incorrectly filtered out by the earlier models, we apply the latest model to the initial full amount of data, and removing the least reliable data in this way will leave more data for the next iteration.

According to embodiments of the present disclosure, the cleaning module 320 may perform data cleaning according to embodiments of the present disclosure on the initial sample set obtained from the pre-processing module 310. In addition to the description above with reference to FIG. 2, the method for processing data according to embodiments of the present disclosure that is performed by the cleaning module 320 may further include: determining, in response to an Nth sample subset and an Nth model not satisfying a corresponding predetermined condition, an (N+1)th sample subset in the Nth sample subset by the Nth model based on the Nth sample subset, N being a positive integer greater than or equal to 2; and generating an (N+1)th model by training the Nth model with the (N+1)th sample subset. According to embodiments of the present disclosure, determining the (N+1)th sample subset in the Nth sample subset may include: obtaining the remaining samples in the Nth sample subset as the (N+1)th sample subset by removing samples having a match probability lower than an Nth match probability threshold in the Nth sample subset, the Nth match probability threshold being greater than an (N−1)th match probability threshold.

Optionally, according to embodiments of the present disclosure, the (N+1)th sample subset may be obtained by removing samples having a match probability lower than the Nth match probability threshold and higher than the Nth lower-limit match probability threshold in the Nth sample subset, the Nth lower-limit match probability threshold being less than the Nth match probability threshold. In this way, it is possible to prevent too many samples from being removed in one cleaning process.

The method for processing data according to embodiments of the present disclosure performed by the cleaning module 320 may further include: determining, in response to at least one of the (N+1)th sample subset and the (N+1)th model satisfying a corresponding predetermined condition, an (N+2)th sample subset of the initial sample set by the (N+1)th model based on the initial sample set; and generating an (N+2)th model by training the (N+1)th model with the (N+2)th sample subset.

According to embodiments of the present disclosure, at least one of the (N+1)th sample subset and the (N+1)th model satisfying the corresponding predetermined condition may include: the number of samples removed to obtain the (N+1)th sample subset being less than an (N+1)th number threshold, and the accuracy of the (N+1)th model reaching an (N+1)th accuracy threshold.

In addition, the method for processing data according to embodiments of the present disclosure performed by the cleaning module 320 may further include: determining, in response to an Mth sample subset being determined, the Mth sample subset as a result sample set, M being a predetermined iteration number threshold, and M being a positive integer greater than or equal to 1; and inputting the result sample set as input data to a long short-term memory-based chatbot model. The method for processing data according to embodiments of the present disclosure will be further described below with reference to FIG. 4.

According to embodiments of the present disclosure, the result sample set from the cleaning module 320 may be traversed in the traversal module 330 to determine whether a degraded sample exists in the result sample set, and the result sample set is updated in response to determining that the degraded sample exists in the result sample set. According to embodiments of the present disclosure, updating the result sample set may include removing the determined degraded sample from the result sample set. In an example embodiment, the degraded sample may include a sample that is obviously erroneous.

Figure 4:
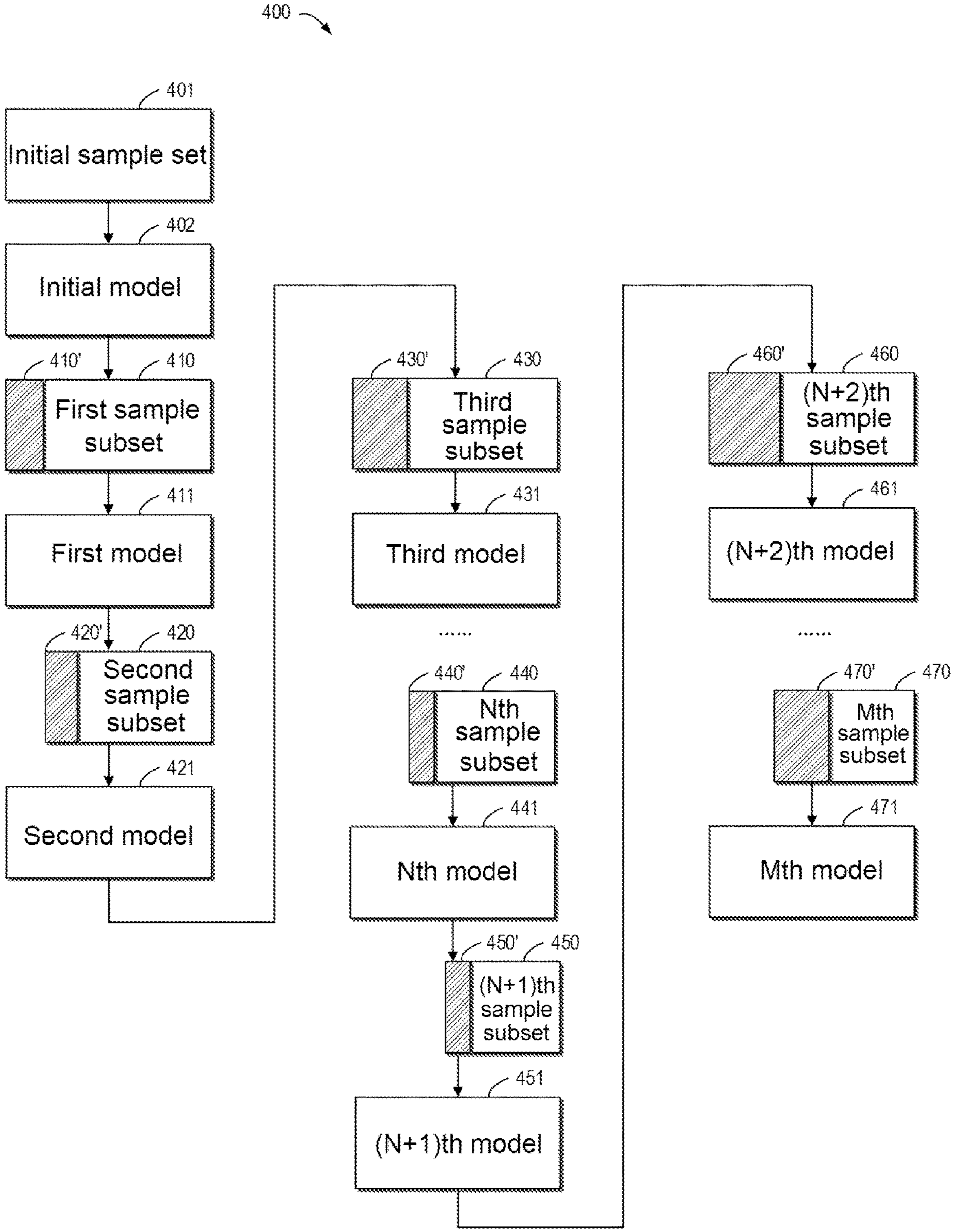
FIG. 4 is a schematic diagram illustrating an example process for data cleaning according to embodiments of the present disclosure.

FIG. 4 is a schematic diagram illustrating an example process 400 for data cleaning according to embodiments of the present disclosure. As illustrated in FIG. 4, a first sample subset 410 in an initial sample set 401 is determined by an initial model 402 based on the initial sample set 401. According to embodiments of the present disclosure, determining the first sample subset 410 may include: obtaining the remaining samples in the initial sample set 401 as the first sample subset 410 by removing samples 410' having a match probability lower than a first match probability threshold in the initial sample set 401. In the example, the first match probability threshold may be 0.5. Since the first sample subset 410 is determined by removing samples with low reliability (e.g., samples 410' with low match probability) in the initial sample set 401, the quality of the first sample subset 410 is higher than the quality of the initial sample set 401, which is because the reliability of the first sample subset 410 is higher.

A first model 411 is generated by training the initial model 402 with the first sample subset 410. Since the first sample subset 410 is determined by removing unreliable samples (e.g., samples 410' with low match probability) from the initial sample set 401, the first model 411 generated by training the initial model 402 with the first sample subset 410 has improved accuracy compared to the initial model 402.

The first model 411 determines a second sample subset 420 based on the first sample subset 410. According to embodiments of the present disclosure, determining the second sample subset 420 may include: obtaining the remaining samples in the first sample subset 410 as the second sample subset 420 by removing samples 420' having a match probability lower than a second match probability threshold in the first sample subset 410. In the example, the second match probability threshold may be 0.6, which is higher than the first match probability threshold in the above example. Since the second sample subset 420 is determined by removing samples 420' with low match probability on the basis of the first sample subset 410, and the condition for determining the second sample subset 420 is more stringent than the condition for determining the first sample subset 410 (that is, the second match probability threshold is greater than the first match probability threshold), the quality of the second sample subset 420 is higher than the quality of the first sample subset 410.

The second model 421 is generated by training the first model 411 with the second sample subset 420. According to embodiments of the present disclosure, by using the more preferred second sample subset 420 to train the first model 411, for example, by adjusting the parameters thereof, the second model 421 with higher accuracy can be generated.

In response to the second sample subset 420 satisfying a predetermined condition therefor (e.g., the number of samples 420' removed to obtain the second sample subset 420 is less than a second number threshold), or in response to the second model 421 satisfying a predetermined condition therefor (e.g., the accuracy of the second model 421 reaches a second accuracy threshold), or in response to both conditions being satisfied, the second model 421 determines a third sample subset 430 of the initial sample set 401 based on the initial sample set 401. According to embodiments of the present disclosure, determining the third sample subset 430 may include: obtaining the remaining samples in the initial sample set 401 as the third sample subset 430 by removing samples 430' having a match probability lower than a third match probability threshold in the initial sample set 401. In the example, the third match probability threshold may be 0.7, which is higher than the first match probability threshold and the second match probability threshold in the above example. That is, as the iteration number increases, the condition for obtaining the sample subset becomes increasingly stringent.

The third model 431 is generated by training the second model 421 with the third sample subset 430. According to embodiments of the present disclosure, by using the more preferred third sample subset 430 to train the second model 421, for example, by adjusting the parameters thereof, the third model 431 with higher accuracy can be generated.

After several iterations, the quality of the determined sample subset gets higher and higher, and the accuracy of the generated model also gets higher and higher. In response to the Nth sample subset 440 and the Nth model 441 not satisfying the corresponding predetermined conditions, the Nth model 441 determines an (N+1)th sample subset 450 of the Nth sample subset 440 based on the Nth sample subset 440, with N being a positive integer greater than or equal to 2. According to embodiments of the present disclosure, determining the (N+1)th sample subset 450 in the Nth sample subset 440 may include: obtaining the remaining samples in the Nth sample subset 440 as the (N+1)th sample subset 450 by removing samples 440' having a match probability lower than an Nth match probability threshold in the Nth sample subset 440, the Nth match probability threshold being greater than an (N−1)th match probability threshold.

An (N+1)th model 451 is generated by training the Nth model 441 with the (N+1)th sample subset 450. According to embodiments of the present disclosure, determining the (N+1)th sample subset in the Nth sample subset may include: obtaining the remaining samples in the Nth sample subset as the (N+1)th sample subset by removing samples having a match probability lower than an Nth match probability threshold in the Nth sample subset, the Nth match probability threshold being greater than an (N−1)th match probability threshold.

In response to at least one of the (N+1)th sample subset 450 and the (N+1)th model 451 satisfying a corresponding predetermined condition, the (N+1)th model 451 determines an (N+2)th sample subset 460 of the initial sample set 401 based on the initial sample set 401. According to embodiments of the present disclosure, at least one of the (N+1)th model 451 and the (N+1)th sample subset 450 satisfying the corresponding predetermined condition includes: the number of samples 450' removed to obtain the (N+1)th sample subset 450 being less than an (N+1)th number threshold, and the accuracy of the (N+1)th model 451 reaching an (N+1)th accuracy threshold.

An (N+2)th model 461 is generated by training the (N+1)th model 451 with the (N+2)th sample subset 460. According to embodiments of the present disclosure, by using the more preferred (N+2)th sample subset 460 to train the (N+1)th model 451, for example, by adjusting the parameters thereof, the (N+2)th model 461 with higher accuracy can be generated. Further iterations can be performed, for example, to remove unreliable samples 460' from the (N+2)th sample subset 460 to obtain the remaining samples in the (N+2)th sample subset 460 as the (N+3)th sample subset, and so on.

In response to an Mth sample subset 470 being determined, illustratively by removing samples 470', the Mth sample subset 470 is determined as a result sample set, with M being a predetermined iteration number threshold, and M being a positive integer greater than or equal to 1. The determined result sample set is input as input data into a chatbot model (e.g., the chatbot model 130 shown in FIG. 1) and/or an Mth model 471. It should be noted that the number of iterations performed and the number of models generated as shown in FIG. 4 are only examples, more or fewer iterations may be performed, and more or fewer models may be generated. The process of determining the result sample set is further described below with reference to FIG. 5.

Figure 5:
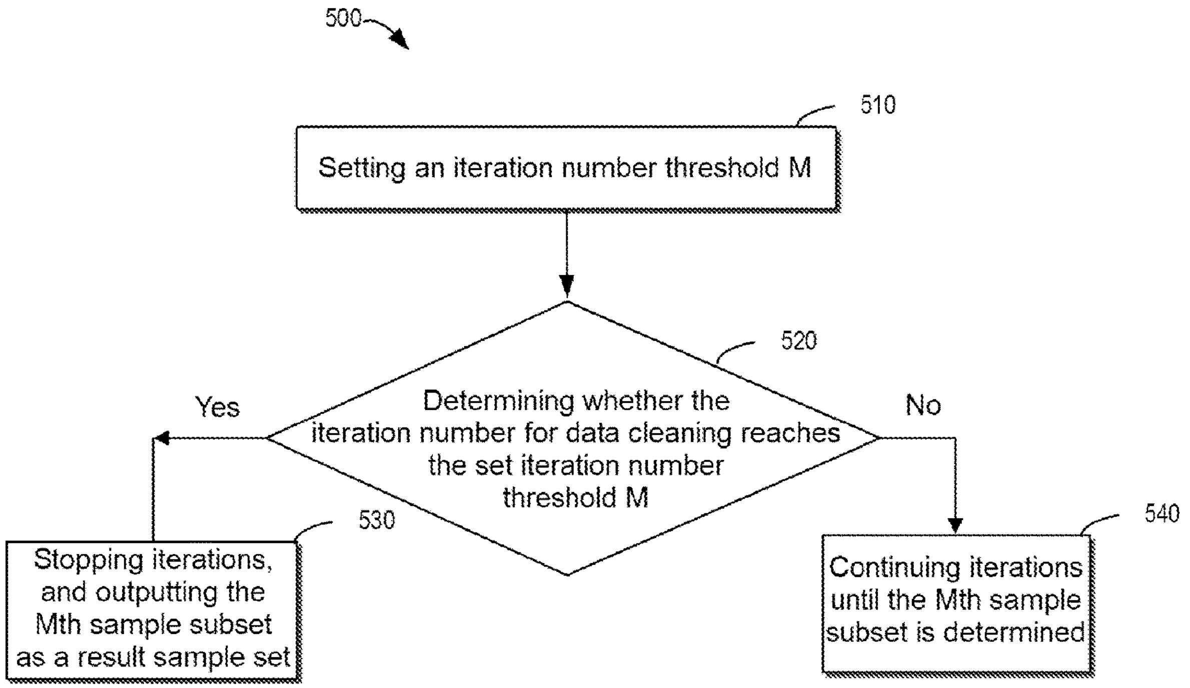
FIG. 5 illustrates an example process for determining a result sample set.

FIG. 5 illustrates an example process 500 for determining a result sample set. As described in FIG. 5, at 510, an iteration number threshold M is set, wherein M may be a positive integer greater than or equal to 1. At 520, it is determined whether the number of iterations for data cleaning reaches the set iteration number threshold M, i.e., whether an Mth sample subset is determined. If yes at 520, the process proceeds to 530 to stop iterations, and outputs the determined Mth sample subset as the result sample set, which is output to the chatbot model for training. If no at 520, the process proceeds to 540 to continue iterations until the Mth sample subset is determined.

According to embodiments of the present disclosure, a solution for data cleaning is implemented, which overcomes the problem of conventional methods that determination is difficult to generalize and requires a lot of manual work. By the method for processing data according to embodiments of the present disclosure, many different types of data can be cleaned, and the process of data cleaning is efficient and automated. The framework for data cleaning of embodiments of the present disclosure also reduces the computational requirements. In this way, the sample quality is improved, thereby improving the performance of the chatbot model.

Figure 6:
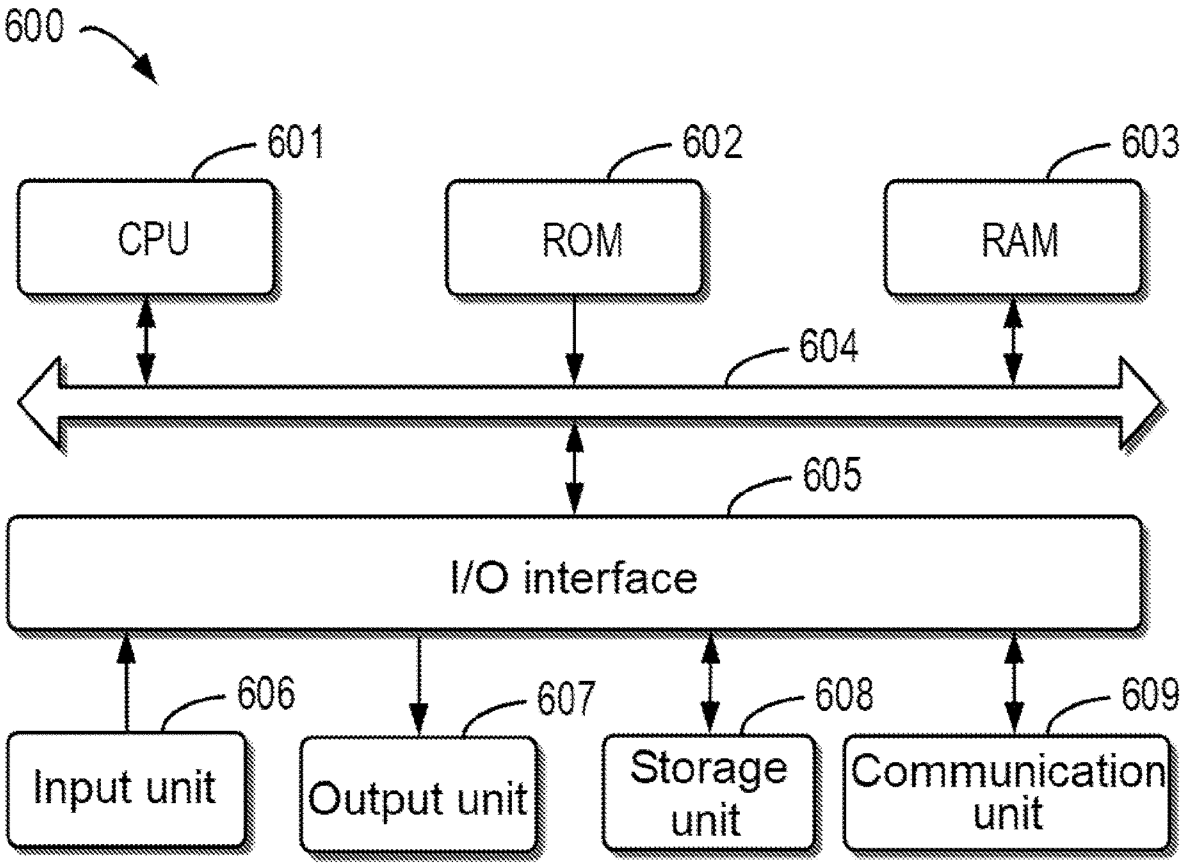
FIG. 6 illustrates a block diagram of an example device that can be used to implement embodiments of the present disclosure.

FIG. 6 illustrates a block diagram of an example device 600 that may be used to implement some embodiments of the present disclosure. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a storage unit 608, such as a magnetic disk and an optical disc; and a communication unit 609, such as a network card, a modem, and a wireless communication transceiver. The communication unit 609 allows the device 600 to exchange information/data with other devices via a computer network such as the Internet and/or various telecommunication networks.

The various processes and processing described above, such as the method 200, may be performed by the CPU 601. For example, in some embodiments, the method 200 may be implemented as a computer software program that is tangibly included in a machine-readable medium such as the storage unit 608. In some embodiments, part of or all the computer program may be loaded and/or installed onto the device 600 via the ROM 602 and/or the communication unit 609. One or more actions of the method 200 described above may be performed when the computer program is loaded into the RAM 603 and executed by the CPU 601.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method, comprising:

determining, in a processor-based machine learning system, a first sample subset in an initial sample set by an initial model based on the initial sample set, the initial model comprising an initial encoder-based machine learning model of the processor-based machine learning system, wherein the initial sample set comprises a plurality of question-answer pairs, each of the plurality of question-answer pairs comprising a question and an answer;

generating, in the processor-based machine learning system, a first model by training the initial model with the first sample subset, the first model comprising a first trained version of the initial encoder-based machine learning model, resulting from training of the initial encoder-based machine learning model using the first sample subset;

determining, in the processor-based machine learning system, a second sample subset in the first sample subset by the first model based on the first sample subset;

generating, in the processor-based machine learning system, a second model by training the first model with the second sample subset, the second model comprising a second trained version of the initial encoder-based machine learning model, resulting from training of the first trained version of the initial encoder-based machine learning model using the second sample subset;

determining, in the processor-based machine learning system and in response to at least one of the second sample subset and the second model satisfying a corresponding predetermined condition, a third sample subset of the initial sample set by the second model based on the initial sample set; and generating, in the processor-based machine learning system, a third model by training the second model with the third sample subset, the third model comprising a third trained version of the initial encoder-based machine learning model, resulting from training of the second trained version of the initial encoder-based machine learning model using the third sample subset;

wherein a chatbot model, different than the initial model, the first model, the second model and the third model, is trained based on at least portions of the third sample subset.

2. The method according to claim 1, further comprising:

determining, in response to an Nth sample subset and an Nth model not satisfying a corresponding predetermined condition, an (N+1)th sample subset in the Nth sample subset by the Nth model based on the Nth sample subset, N being a positive integer greater than or equal to 2; and generating an (N+1)th model by training the Nth model with the (N+1)th sample subset.

3. The method according to claim 2, wherein determining the first sample subset in the initial sample set comprises: obtaining the remaining samples in the initial sample set as the first sample subset by removing samples having a match probability lower than a first match probability threshold in the initial sample set; and determining the (N+1)th sample subset in the Nth sample subset comprises: obtaining the remaining samples in the Nth sample subset as the (N+1)th sample subset by removing samples having a match probability lower than an Nth match probability threshold in the Nth sample subset, the Nth match probability threshold being greater than an (N-1)th match probability threshold.

4. The method according to claim 3, wherein the first sample subset is further obtained by removing samples having a match probability lower than the first match probability threshold and higher than a first lower-limit match probability threshold in the initial sample set, the first lower-limit match probability threshold being less than the first match probability threshold; and the (N+1)th sample subset is further obtained by removing samples having a match probability lower than the Nth match probability threshold and higher than an Nth lower-limit match probability threshold in the Nth sample subset, the Nth lower-limit match probability threshold being less than the Nth match probability threshold.

5. The method according to claim 2, further comprising:

determining, in response to at least one of the (N+1)th sample subset and the (N+1)th model satisfying a corresponding predetermined condition, an (N+2)th sample subset of the initial sample set by the (N+1)th model based on the initial sample set; and generating an (N+2)th model by training the (N+1)th model with the (N+2)th sample subset.

6. The method according to claim 5, wherein at least one of the second sample subset and the second model satisfying the corresponding predetermined condition comprises: a number of samples removed to obtain the second sample subset being less than a second number threshold, and the accuracy of the second model reaching a second accuracy threshold; and at least one of the (N+1)th sample subset and the (N+1)th model satisfying the corresponding predetermined condition comprises: a number of samples removed to obtain the (N+1)th sample subset being less than an (N+1)th number threshold, and the accuracy of the (N+1)th model reaching an (N+1)th accuracy threshold.

7. The method according to claim 5, further comprising:

determining, in response to an Mth sample subset being determined, the Mth sample subset as a result sample set, M being a predetermined iteration number threshold, and M being a positive integer greater than or equal to 1; and inputting the result sample set as input data to a long short-term memory-based chatbot model.

8. The method according to claim 1, wherein the initial model is a model based on bidirectional encoder representations from transformers; and samples in the initial sample set are pre-processed.

9. The method according to claim 8, wherein the pre-processing comprises:

obtaining tokens for original data by tokenizing the original data;

standardizing the tokens;

obtaining the standardized tokens; and obtaining the initial sample set by adjusting the standardized tokens.

10. The method according to claim 7, further comprising:

determining whether a degraded sample exists in the result sample set by traversing the result sample set; and updating the result sample set in response to determining that the degraded sample exists in the result sample set.

11. An electronic device, comprising:

at least one processor; and memory coupled to the at least one processor and storing instructions, wherein the instructions, when executed by the at least one processor, cause the electronic device to perform the actions comprising:

determining, in a processor-based machine learning system, a first sample subset in an initial sample set by an initial model based on the initial sample set, the initial model comprising an initial encoder-based machine learning model of the processor-based machine learning system, wherein the initial sample set comprises a plurality of question-answer pairs, each of the plurality of question-answer pairs comprising a question and an answer;

generating, in the processor-based machine learning system, a first model by training the initial model with the first sample subset, the first model comprising a first trained version of the initial encoder-based machine learning model, resulting from training of the initial encoder-based machine learning model using the first sample subset;

determining, in the processor-based machine learning system, a second sample subset in the first sample subset by the first model based on the first sample subset;

generating, in the processor-based machine learning system, a second model by training the first model with the second sample subset, the second model comprising a second trained version of the initial encoder-based machine learning model, resulting from training of the first trained version of the initial encoder-based machine learning model using the second sample subset;

determining, in the processor-based machine learning system and in response to at least one of the second sample subset and the second model satisfying a corresponding predetermined condition, a third sample subset of the initial sample set by the second model based on the initial sample set; and generating, in the processor-based machine learning system, a third model by training the second model with the third sample subset, the third model comprising a third trained version of the initial encoder-based machine learning model, resulting from training of the second trained version of the initial encoder-based machine learning model using the third sample subset;

wherein a chatbot model, different than the initial model, the first model, the second model and the third model, is trained based on at least portions of the third sample subset.

12. The electronic device according to claim 11, wherein the actions further comprise:

determining, in response to an Nth sample subset and an Nth model not satisfying a corresponding predetermined condition, an (N+1)th sample subset in the Nth sample subset by the Nth model based on the Nth sample subset, N being a positive integer greater than or equal to 2; and generating an (N+1)th model by training the Nth model with the (N+1)th sample subset.

13. The electronic device according to claim 12, wherein determining the first sample subset in the initial sample set comprises: obtaining the remaining samples in the initial sample set as the first sample subset by removing samples having a match probability lower than a first match probability threshold in the initial sample set; and determining the (N+1)th sample subset in the Nth sample subset comprises: obtaining the remaining samples in the Nth sample subset as the (N+1)th sample subset by removing samples having a match probability lower than an Nth match probability threshold in the Nth sample subset, the Nth match probability threshold being greater than an (N-1)th match probability threshold.

14. The electronic device according to claim 13, wherein the first sample subset is further obtained by removing samples having a match probability lower than the first match probability threshold and higher than a first lower-limit match probability threshold in the initial sample set, the first lower-limit match probability threshold being less than the first match probability threshold; and the (N+1)th sample subset is further obtained by removing samples having a match probability lower than the Nth match probability threshold and higher than an Nth lower-limit match probability threshold in the Nth sample subset, the Nth lower-limit match probability threshold being less than the Nth match probability threshold.

15. The electronic device according to claim 12, wherein the actions further comprise:

determining, in response to at least one of the (N+1)th sample subset and the (N+1)th model satisfying a corresponding predetermined condition, an (N+2)th sample subset of the initial sample set by the (N+1)th model based on the initial sample set; and generating an (N+2)th model by training the (N+1)th model with the (N+2)th sample subset.

16. The electronic device according to claim 15, wherein at least one of the second sample subset and the second model satisfying the corresponding predetermined condition comprises: a number of samples removed to obtain the second sample subset being less than a second number threshold, and the accuracy of the second model reaching a second accuracy threshold; and at least one of the (N+1)th sample subset and the (N+1)th model satisfying the corresponding predetermined condition comprises: a number of samples removed to obtain the (N+1)th sample subset being less than an (N+1)th number threshold, and the accuracy of the (N+1)th model reaching an (N+1)th accuracy threshold.

17. The electronic device according to claim 15, wherein the actions further comprise:

determining, in response to an Mth sample subset being determined, the Mth sample subset as a result sample set, M being a predetermined iteration number threshold, and M being a positive integer greater than or equal to 1; and inputting the result sample set as input data to a long short-term memory-based chatbot model.

18. The electronic device according to claim 11, wherein the initial model is a model based on bidirectional encoder representations from transformers; and samples in the initial sample set are pre-processed.

19. The electronic device according to claim 17, wherein the actions further comprise:

determining whether a degraded sample exists in the result sample set by traversing the result sample set; and updating the result sample set in response to determining that the degraded sample exists in the result sample set.

20. A computer program product comprising a non-transitory computer-readable storage medium having machine-executable instructions stored therein, wherein the machine-executable instructions, when executed by a machine, cause the machine to perform actions comprising:

determining, in a processor-based machine learning system, a first sample subset in an initial sample set by an initial model based on the initial sample set, the initial model comprising an initial encoder-based machine learning model of the processor-based machine learning system, wherein the initial sample set comprises a plurality of question-answer pairs, each of the plurality of question-answer pairs comprising a question and an answer;

generating, in the processor-based machine learning system, a first model by training the initial model with the first sample subset, the first model comprising a first trained version of the initial encoder-based machine learning model, resulting from training of the initial encoder-based machine learning model using the first sample subset;

determining, in the processor-based machine learning system, a second sample subset in the first sample subset by the first model based on the first sample subset;

generating, in the processor-based machine learning system, a second model by training the first model with the second sample subset, the second model comprising a second trained version of the initial encoder-based machine learning model, resulting from training of the first trained version of the initial encoder-based machine learning model using the second sample subset;

determining, in the processor-based machine learning system and in response to at least one of the second sample subset and the second model satisfying a corresponding predetermined condition, a third sample subset of the initial sample set by the second model based on the initial sample set; and generating, in the processor-based machine learning system, a third model by training the second model with the third sample subset, the third model comprising a third trained version of the initial encoder-based machine learning model, resulting from training of the second trained version of the initial encoder-based machine learning model using the third sample subset;

wherein a chatbot model, different than the initial model, the first model, the second model and the third model, is trained based on at least portions of the third sample subset.

* * * * *